United States Patent
Hubert et al.

(10) Patent No.: US 12,066,527 B2
(45) Date of Patent: Aug. 20, 2024

(54) METHOD FOR CORRECTING A PREVIOUSLY ESTIMATED POSITION OF A VEHICLE

(71) Applicant: IXBLUE, Saint-Germain-en-Laye (FR)

(72) Inventors: Jean-Michel Hubert, Saint-Germain-en-Laye (FR); Hugues De Becdelievre, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 635 days.

(21) Appl. No.: 17/287,020

(22) PCT Filed: Oct. 18, 2019

(86) PCT No.: PCT/FR2019/052483
§ 371 (c)(1),
(2) Date: Apr. 20, 2021

(87) PCT Pub. No.: WO2020/084234
PCT Pub. Date: Apr. 30, 2020

(65) Prior Publication Data
US 2021/0389449 A1    Dec. 16, 2021

(30) Foreign Application Priority Data
Oct. 22, 2018    (FR) ...................................... 1859750

(51) Int. Cl.
*G01S 13/89* (2006.01)
*G01C 21/16* (2006.01)
(Continued)

(52) U.S. Cl.
CPC .......... *G01S 13/89* (2013.01); *G01C 21/1652* (2020.08); *G01S 13/937* (2020.01)

(58) Field of Classification Search
CPC .... G01S 13/89; G01S 13/937; G01C 21/1652
See application file for complete search history.

(56) References Cited

U.S. PATENT DOCUMENTS 5,485,384 A * 1/1996 Falconnet ............... G01S 13/86
   701/445

FOREIGN PATENT DOCUMENTS

| EP | 3 029 487 | 6/2016 | |
| EP | 3029487 A1 * | 6/2016 | .......... G01C 21/005 |
| FR | 2 997 182 | 4/2014 | |

OTHER PUBLICATIONS

H. Mostafavi-F. Smith (Systems Control)—Image Correlation with Geometric Distorsion—Part I: Acquisition Performance—Part II: Effect on Local Accuracy—IEEE Transactions, vol. AES-14, pp. 487-500, May 1978 (Year: 1978).*

(Continued)

*Primary Examiner* — Timothy A Brainard
*Assistant Examiner* — Helena H Seraydaryan
(74) *Attorney, Agent, or Firm* — NIXON & VANDERHYE

(57) ABSTRACT

Disclosed is a method for resetting the estimated position of a vehicle, including: —a step of receiving by a RADAR system a real RADAR image, —a step of acquiring an estimated position of the vehicle, —a step of calculating by a computer equipping the vehicle a simulated RADAR image, as a function of the estimated position of the vehicle and of a cartographic model of the environment of the vehicle, —a step of comparing the real RADAR image and the simulated RADAR image, and —a step of correcting the estimated position of the vehicle as a function of the result of the comparison.

14 Claims, 1 Drawing Sheet

(51) Int. Cl.
  *G01S 13/93*    (2020.01)
  *G01S 13/937*   (2020.01)

(56) References Cited

OTHER PUBLICATIONS

International Search Report for PCT/FR2019/052483 dated Feb. 4, 2020, 7 pages.
Writen Opinion of the ISA for PCT/FR2019/052483 dated Feb. 4, 2020, 8 pages.
Han et al., "GPS-less Coastal Navigation using Marine Radar or USV Operation", IFAC-PapersOnLine—8$^{th}$ IFAC Symposium on Advances on Automotive Control AAC 2016, Jan. 1, 2016, vol. 49, No. 23, pp. 598-603 (6 total pages).
Ma et al. "Radar Image-Based Positioning for USV Under GPS Denial Environment", IEEE Transactions on Intelligent Transportation Systems, Jan. 1, 2018, vol. 19, No. 1, pp. 72-80 (9 total pages).

\* cited by examiner

METHOD FOR CORRECTING A PREVIOUSLY ESTIMATED POSITION OF A VEHICLE

CROSS-REFERENCE TO RELATED APPLICATIONS

This application is the U.S. national phase of International Application No. PCT/FR2019/052483 filed Oct. 18, 2019 which designated the U.S. and claims priority to FR 1859750 filed Oct. 22, 2018, the entire contents of each of which are hereby incorporated by reference.

TECHNICAL FIELD TO WHICH THE INVENTION RELATES

The present invention generally relates to the positioning of a vehicle in its environment.

It more particularly relates to a method for correcting a previously estimated position of a mobile vehicle. It also relates to a vehicle fitted with a RADAR system and a computer adapted to implement such a correction method.

The invention finds a particularly advantageous application in the resetting of an inertial unit installed on a ship.

TECHNOLOGICAL BACK-GROUND

Nowadays, great size ships are fitted with satellite geolocation systems of the GPS or Galileo type, enabling them to accurately determine their location on the globe.

However, these geolocation systems suffer from three well-known limits.

The first limit is that they can be intentionally jammed by the system provider, in particular in conflict zones. It is therefore no longer possible to enter such zones without risk.

The second limit is that these systems can be deluded, which is liable to lead to the ship sinking.

The third limit is that the ships may sometimes be located in interfering environments, such as fjords, which do not allow them to receive the data transmitted by the satellites.

It is hence known to fit a ship with an inertial unit, in addition to this navigation system. Due to its intrinsic principle of operation, such an inertial unit can indeed neither be jammed, nor deluded, nor hampered by the environment.

Such an inertial unit is able to determine the ship acceleration in the three dimensions of space and to deduce its speed therefrom. Consequently, knowing the starting position of the ship and the initial speed thereof, it is possible to determine, using only the inertial unit, the position of the ship at any time instant.

The major drawback of such an inertial unit is that the results it provides always exhibit a temporal drift. Hence, if the calculation of the ship position initially suffers from very limited errors, these errors accumulate over time, which finally lead to aberrant results.

To minimize this drift, it is then known to regularly reset the inertial unit using the data obtained from the geolocation system. But, here again, this resetting is effective only if these data are available and are neither jammed, nor deluded.

OBJECT OF THE INVENTION

In order to remedy this drawback, the present invention proposes to reset the inertial unit no longer using a position provided by a geolocation system, but rather using images provided by a RADAR system installed on the vehicle.

More particularly, it is proposed according to the invention a method for correcting the position of a vehicle, comprising:
- a step of reception, by the RADAR system, of a real RADAR image,
- a step of acquisition, by a computer installed on the vehicle, of an estimated position of the vehicle,
- a step of elaboration, by the computer, of a simulated RADAR image as a function of the estimated position of the vehicle and if a cartographic model of the vehicle environment,
- a step of comparison of the real RADAR image and the simulated RADAR image, and
- a step of correction of the estimated position of the vehicle as a function of the comparison result.

Hence, thanks to the invention, the real RADAR image (received from the RADAR system) is compared with the simulated RADAR image (that which should be received from the RADAR system if the estimated position of the vehicle was exact). The comparison of these two images makes it possible to determine if the estimated position is exact and, if not, what is the exact position of the vehicle.

Other advantageous and non-limitative features of the resetting method according to the invention are the following:
- at the comparison step, it is provided to calculate several levels of correlation between the real RADAR image and the simulated RADAR image, by varying between each calculation at least one of the following parameters: the relative direction angle between the real RADAR image and the simulated RADAR image; the relative position between the real RADAR image and the simulated RADAR image; the relative scale factor between the real RADAR image and the simulated RADAR image;
- the acquisition, elaboration and comparison steps are repeated with different estimated positions of the vehicle;
- at the correction step, the estimated position of the vehicle is corrected as a function of the results of said comparisons;
- at each comparison step, it is provided to calculate at least one level of correlation between the real RADAR image and the simulated RADAR image, and at the correction step, the simulated RADAR image for which the calculated level of correlation is the highest is selected;
- the vehicle is a ship being on the sea;
- at the elaboration step, the simulated RADAR image is determined as a function also of the state of the sea and/or of the posture of the boat;
- at the acquisition step, the estimated position of the vehicle is obtained via an inertial unit installed on the vehicle;
- at the correction step, an inertial unit installed on the vehicle is reset as a function of the corrected estimated position of the vehicle;
- at the elaboration step, an error linked to the accuracy of elaboration of the simulated RADAR image is determined;
- at the correction step, the inertial unit is reset as a function of the determined error;
- at the correction step during a first time step, it is provided to define a pool of uncertainty corresponding to a zone in which the vehicle is located, and, during a second time step, the acquisition step is repeated using several estimated position of the vehicle located within said pool of uncertainty;

after the reception step, it is provided to determine if a sea coast is visible on the real RADAR image, then, if so, the acquisition, elaboration, comparison and correction steps are automatically implemented by the computer;

the estimated position of the vehicle is corrected in consideration of an error factor relating to the error of estimated position obtained from the inertial unit and/or to the error of reception of the RADAR system and/or an error of elaboration of the real RADAR image by the RADAR system.

The invention also relates to a vehicle fitted with a RADAR system and a computer adapted to implement a correction method as mentioned hereinabove.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 1:
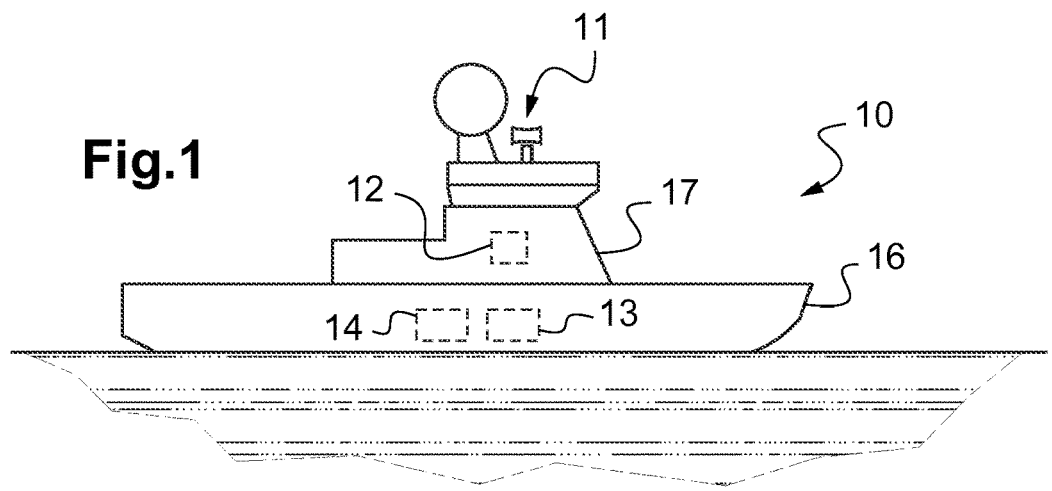
FIG. 1 is a schematic side view of a ship.

In FIG. 1, a mobile vehicle is shown. It is a boat, more precisely a ship 1 adapted to navigate in open seas. As an alternative, it could be another type of vehicle (submarine, aircraft . . . ).

This ship 1 conventionally comprises a hull 16 topped with a bridge 17.

The ship 10 moreover comprises, above the bridge 17, a RADAR system 11.

This RADAR system 11 is more specifically designed to use the electromagnetic waves in order to detect the presence of coasts located near the ship 10 and in order to determine their positions.

It is herein a standard maritime navigation RADAR system, using the "X-band" frequency band.

As an alternative, an "S-band" RADAR system could be used, but the accuracy obtained within the framework of the method described hereinafter would be poorer. Higher security margins should then be used to pilot the ship 10.

The ship 100 moreover comprises an inertial unit 13. This inertial unit 13 is herein of the FOG, i.e. fibre-optic type. It can for example be an inertial unit such as those marketed by iXBlue company, for example in one of the following ranges: QUADRANS, OCTANS, PHINS, MARINS.

This inertial unit 13 is able to determine the acceleration undergone at each time instant by the ship 10 in the three directions of space. It moreover includes an electronic and/or computer unit adapted to deduce from this acceleration the speed of the ship 10.

Knowing the exact position, the exact direction and the exact speed of the ship 10 at a given time instant, the electronic and/or computer unit of the inertial unit 13 is also able to deduce therefrom an estimated position and an estimated direction of the ship 10 at any time instant.

The estimation of this position and this direction however tends to derive over time, due to initially very limited errors that accumulate over time.

It is herein considered that the inertial unit is of the gyrocompass type, that is to say it is able to detect the geographic North. That way, the inertial unit 13 will be able to correct the estimated direction of the ship 10.

To correct the estimated position of the ship 10 (it is herein talked about the inertial unit 13), the ship 10 comprises a computer 12 connected to the RADAR system 11 and to the inertial unit 13.

This computer 12 is designed to collect the real RADAR images obtained by the RADAR system 11 as well as the estimated position of the ship 10 obtained by the inertial unit 13.

It includes at least one processor (CPU), at least one memory and different input and output interfaces allowing it to communicate with the RADAR system 11 and with the inertial unit 13.

It will be noted that if the computer 12 is herein distinct from the inertial unit 13, as an alternative, it can be integrated to the latter.

Thanks to its memory, the computer memorizes data used within the framework of the estimated position correction method described hereinafter.

It memorizes in particular a cartographic model of the ship 10 environment. In practice, this cartographic model is a digital terrain model 14, for example of the SRTM ("Shuttle Radar Topography Mission") type. Such a digital terrain model 14 is consisted of topographic matrix and vector files, which are provided by American agencies and which give the altitude of the relief over a major part of the globe.

The computer 12 also memorizes a computer application consisted of computer programs comprising instructions whose execution by the processor allows the implementation by the computer of the method for correcting the estimated position of the ship 10.

According to the invention, this correction method comprises five main steps, i.e.:
  a step of receiving a real RADAR image 100,
  a step of acquiring an estimated position P2 of the ship 10,
  a step of elaborating a simulated RADAR image 20 as a function of the estimated position P2 of the ship 10 and of the digital terrain model 14,
  a step of comparing the real RADAR image 100 and the simulated RADAR image 200, and
  a step of correcting the estimated position P2 of the ship 10 as a function of the result of said comparison.

This method is herein implemented automatically, i.e. without express instruction from an individual, from the moment that the coast is seen on the real RADAR image 100.

During the first, reception step, the RADAR system 11 elaborates a RADAR image representing the position of the different obstacles detected around the ship 10, then it transmits this image to the computer 12. This step is performed in a conventional manner.

The so-acquired image, hereinafter called the real RADAR image 100, is hence a raw image that is not reprocessed by the computer 12.

Figure 2:
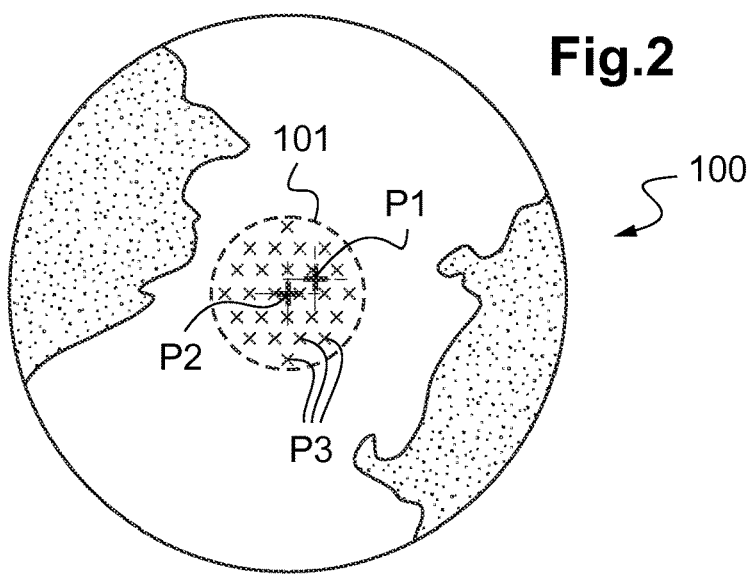
FIG. 2 illustrates an example of a real RADAR image obtained by a RADAR system installed on the ship of FIG. 1.

An example of real RADAR image 100 is shown in FIG. 2. The central cross represents the exact position P1 of the ship 10 and the curves represent the coasts located near the ship 10. In this example, the ship 10 passes through a channel.

During the second, acquisition step, the inertial unit 13 calculates an estimation of the ship 10 position, then transmits this estimated position to the computer 12.

Herein, the inertial unit 13 also transmits to the computer 12 other pieces of information, among which:
- the estimated direction of the ship 10 with respect to the North,
- the pitch angle of the ship 10, and
- the roll angle of the ship 10.

The estimated position P2 is herein expressed by a latitude and a longitude, in degrees, minutes and seconds.

As shown in FIG. 2, the estimated position P2 of the ship 10 is generally offset with respect to the exact position P1 of the ship 10, due to the drift of the calculations performed by the inertial unit 13.

In practice, the maximum drift of the inertial unit 13 is known. In other words, if the exact position P1 of the ship 10 is unknown, the inertial unit 13 is able to know at any time instant in which area the ship 10 is located. In FIG. 2, this area is illustrated by a disk 101 that is centred about the estimated position P2 (FIG. 2) and whose radius depends on the time elapsed from the last known exact position of the ship 10.

Herein, the computer 12 will then discretize this area into a plurality of possible positions P3 to which the ship 10 can be.

For that purpose, the computer 12 "meshes" the disk 101 and defines a possible position P3 at the crossing of each mesh. The mesh fineness (i.e. the distance between the possible positions) is herein predefined, as a function of the desired accuracy. It can for example be comprised between 1 and 100 metres.

As an alternative, it can be provided that this mesh fineness is variable, as a function for example of the distance separating the ship 10 from the coast.

As another alternative, the computer could define differently the possible positions, for example using a Point Mass Filter or PMF, the supply of which will be explained at the end of this disclosure.

During the third, elaboration step, the computer 12 will generate simulated RADAR images 200.

A simulated RADAR image 200 will be elaborated for each possible position P3 of the ship 10, in order to represent the RADAR image that could be received from the RADAR system 10 if the ship 10 was exactly at the considered possible position P3.

Each simulated RADAR image 200 is elaborated as a function at least of the possible position P3 that is associated thereto and as a function of the data provided by the digital terrain model 14.

Here, each simulated RADAR image 200 is elaborated also as a function of the roll angle and the pitch angle of the ship 10.

More precisely, to elaborate a simulated RADAR image 200, the computer 12 begins by finding in the digital terrain model 14 the position of the coasts located in a circle that is centred on the considered possible position P3 of the ship 10 and whose radius corresponds to the effective range of the RADAR system 11.

It can hence plot a RADAR image sketch.

It can hence correct this sketch by taking into account the roll angle and the pitch angle of the ship 10. Indeed, the roll and pitch modify the direction of the RADAR system 11 with respect to the sea, which affects the real RADAR images that this system acquires. This correction hence aims to affect in the same way the RADAR image sketch.

Once the sketch corrected, the computer 12 hence obtains a simulated RADAR image 200.

Figure 3:
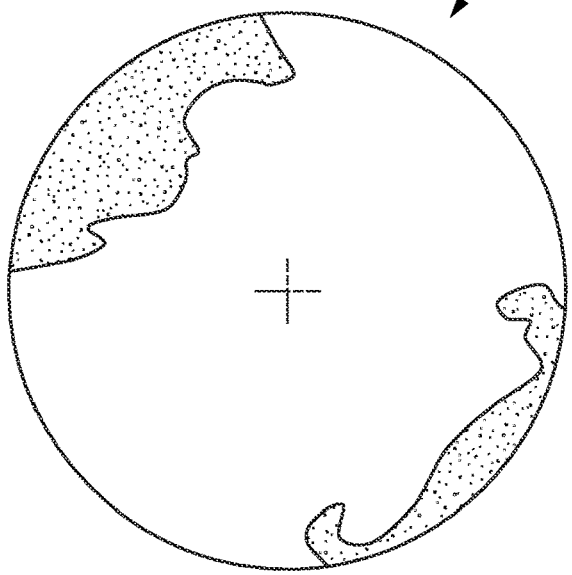
FIG. 3 illustrates an example of a simulated RADAR image elaborated by a computer installed on the ship of FIG. 1.

Such an image is shown in FIG. 3. It can be seen that it is different from the real RADAR image of FIG. 2, because it exhibits a slight position offset, a slight direction offset and a scale default.

As an alternative, this simulated RADAR image 200 could also be corrected, to take into account the state of the sea or the weather, which are also liable to affect the real RADAR images 100 that the RADAR system 11 acquires.

It will be noted herein that the exact calculations for elaborating the simulated RADAR images 200 won't be described herein, because they vary as a function of many factors such as the chosen type of RADAR system 11, the position of the RADAR system 11 on the ship 10 . . . . An algorithm for generating the simulated RADAR images 200 will hence have to be developed for each type of ship, after a test survey in real conditions making it possible to collect the required data for developing this algorithm.

These real condition tests will further make it possible to determine an error model linked to the inaccuracy of the algorithm for generating the simulated RADAR image 200. This error model will make it possible to calculate, at the generation of each simulated RADAR image 200, an index of confidence in the image correctness.

This confidence index can for example be function of the state of the sea and/or the weather and/or the quantity of coasts detected by the RADAR system 11. The usefulness of this confidence index will be described in detail hereinafter.

To sum up, during this third step, the computer 12 will calculate, for each possible position P3 of the ship 10, a simulated RADAR image 200 associated with a confidence index.

During the fourth, comparison step, the computer compares each simulated RADAR image 200 (associated with each possible position P3) with the real RADAR image 100.

This comparison step is performed by means of correlation calculations. These calculations aim to determine to what extent the simulated 200 and real 100 RADAR images overlay each other.

For that purpose, the computer firstly considers a first simulated RADAR image 200.

It then calculates the level of correlation between the real RADAR image 100 and this first simulated RADAR image 200.

Then it repeats these operations with each of the other simulated RADAR images 200.

It then selects the simulated RADAR image 200 for which the level of correlation with the real RADAR image 100 is the highest. This simulated RADAR image 200 will be called hereinafter "selected RADAR image".

At this stage, the computer can hence estimate that the possible position P3 associated with the selected RADAR image is the possible position P3 that is the closest to the exact position P1 of the ship 10.

Preferentially, the computer 12 will refine the accuracy of the search for the exact position P1 of the ship 10. For that purpose, the computer 12 calculates several levels of correlation between the real RADAR image 100 and the selected RADAR image, by varying each time one at least of the following parameters:
- the relative direction angle between the real RADAR image 100 and the selected RADAR image,
- the relative position between the real RADAR image 100 and the selected RADAR image,
- the relative scale factor between the real RADAR image 100 and the selected RADAR image.

This triplet of parameters indeed makes it possible to play on how the two images overlay each other before being correlated.

Selecting the triplet of parameters for which the level of correlation is the highest hence makes it possible to find the position in which the two images exhibit the best overlaying.

During the fifth, correction step, the computer 12 then corrects the position of the ship 10, by now considering that the exact position P1 of the ship 10 is the possible position P3 associated with the selected RADAR image, corrected as a function of the selected triplet of parameters.

Then, the computer 12 transmits to the inertial unit 13 a signal making it possible to reset the latter.

This signal comprises at least the corrected position of the ship and the confidence index associated with the selected possible position P3.

These two data are then stored in the inertial unit 13 so that the latter can subsequently determine new estimates of its position.

It will be noted herein that the inertial unit 13 uses, to determine at each time instant a new estimate of the ship 10 position, a calculation method based on a state observer. This state observer is herein a Kalman filter, which can then be reset by the new position that is obtained and which takes into account the received confidence index.

The present invention is not limited in any way to the embodiment that has been described and represented, but the person skilled in the art will be able to apply thereto any variant in accordance with the invention.

Hence, in the embodiment described hereinabove, only the selected possible position P3 and the associated triplet of parameters are used to correct the position of the ship that had been estimated by the inertial unit 13.

As an alternative, the computer 12 could keep in memory other possible positions P3, in particular those which are associated with high levels of correlation, so as to supply the above-mentioned PMF filter with news probabilities of possible positions P3 (the weight of these probabilities being formed by the corresponding level of correlation). Hence, this PMF filter would make it possible to provide at each time instant new possible positions P3 of the ship 10, these positions delimiting a pool of uncertainty in which is located the real position of the ship 10.

According to another alternative of the invention, the errors of the inertial unit and of the RADAR system could be taken into account in order to correct the estimated position of the vehicle. By way of example, in the case where a PMF filter is used, the size of the pool of uncertainty will vary as a function of:
- an error coefficient associated with the inertial unit (this error coefficient being provided by the constructor of the unit) and/or
- an error coefficient associated with the RADAR system (this error coefficient being provided by the constructor of the RADAR system and relating to the signal reception errors and/or to the RADAR image elaboration errors).

The invention claimed is:

1. A method for correcting the position of a vehicle, the method comprising:
   a step of receiving, by the RADAR system installed on said vehicle, a real RADAR image;
   a step of acquiring, by a computer installed on said vehicle, an estimated position of the vehicle;
   a step of elaborating, by the computer, a simulated RADAR image as a function of the estimated position of the vehicle and of a cartographic model of the vehicle environment;
   a step of comparing the real RADAR image and the simulated RADAR image; and
   a step of correcting the estimated position of the vehicle as a function of a result of the comparing,
   wherein the acquiring, elaborating, and comparing steps are repeated at successive time steps with different estimated positions of the vehicle,
   wherein, at the correcting step during a first time step of the successive time steps, defining a pool of uncertainty corresponding to a zone in which the vehicle is located,
   wherein, during a second time step of the successive time steps, the acquiring step is repeated using a plurality of estimated positions of the vehicle located within the pool of uncertainty, and
   wherein, at the correcting step, the estimated position of the vehicle is corrected as a function of the results of the comparing steps.

2. The correction method according to claim 1, wherein the comparing step comprises calculating several levels of correlation between the real RADAR image and the simulated RADAR image, by varying between each calculation at least one of the following parameters:
   the relative direction angle between the real RADAR image and the simulated RADAR image,
   the relative position between the real RADAR image and the simulated RADAR image,
   the relative scale factor between the real RADAR image and the simulated RADAR image.

3. The correction method according to claim 1, wherein each of the comparing steps comprises calculating at least one level of correlation between the real RADAR image and the simulated RADAR image, and
   wherein, at the correcting step, the simulated RADAR image for which the calculated level of correlation is the highest is selected.

4. The correction method according to claim 1, wherein the vehicle is a ship being on the sea.

5. The correction method according to claim 4, wherein, at the elaborating step, the simulated RADAR image is also determined as a function of the state of the sea or the posture of the boat.

6. The correction method according to claim 4, wherein, after the receiving step, determining when a sea coast is visible on the real RADAR image, and
   wherein, when the sea coast is visible on the real RADAR image, the acquiring, elaborating, comparing, and correcting steps are automatically implemented by the computer.

7. The correction method according to claim 1, wherein, at the acquiring step, the estimated position of the vehicle is obtained via an inertial unit installed on the vehicle.

8. The correction method according to claim 7, wherein the estimated position of the vehicle is corrected in consideration of an error factor relating to one of:
   an error of position determination by the inertial unit,
   an error of reception of the RADAR system, and
   an error of elaboration of the real RADAR image by the RADAR system.

9. The correction method according to claim 1, wherein, at the correcting step, an inertial unit installed on the vehicle is reset as a function of the corrected estimated position of the vehicle.

10. The correction method according to claim 9, wherein, at the elaborating step, an error linked to the accuracy of elaboration of the simulated RADAR image is determined, and
 wherein, at the correcting step, the inertial unit is reset as a function of the determined error.

11. A vehicle comprising:
a RADAR system; and
a computer,
 wherein the vehicle is configured to implement the correction method as defined in claim 1.

12. A non-transitory computer-readable medium on which is stored a program that, when executed by a computer, performs the method of claim 1.

13. The correction method according to claim 2, wherein the vehicle is a ship being on the sea.

14. The correction method according to claim 3, wherein the vehicle is a ship being on the sea.

* * * * *